Feb. 26, 1952 J. W. TALBERT 2,587,406
COTTON CHOPPER
Filed Nov. 23, 1948 5 Sheets-Sheet 1
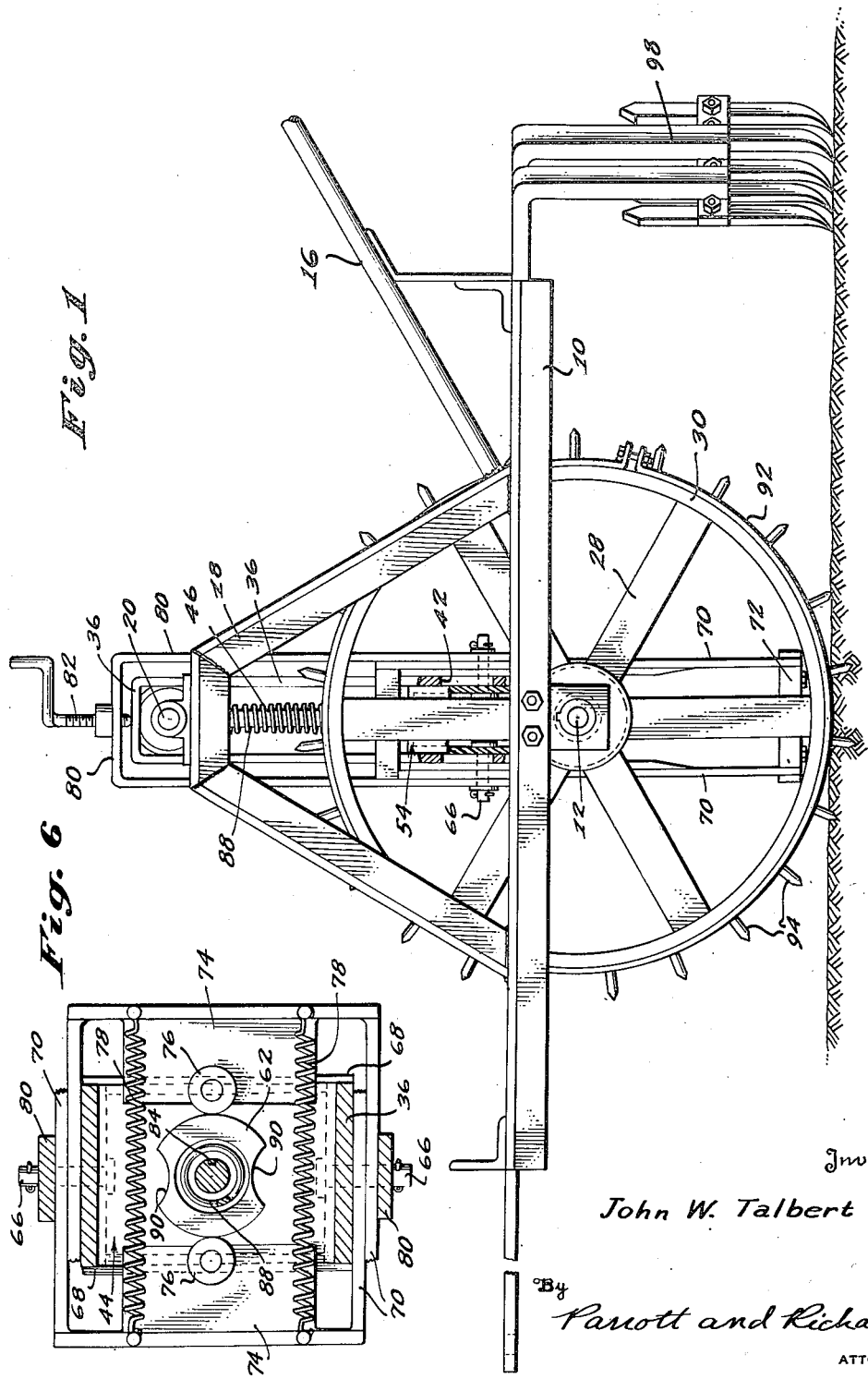
Inventor
John W. Talbert
By Parrott and Richards
ATTORNEYS

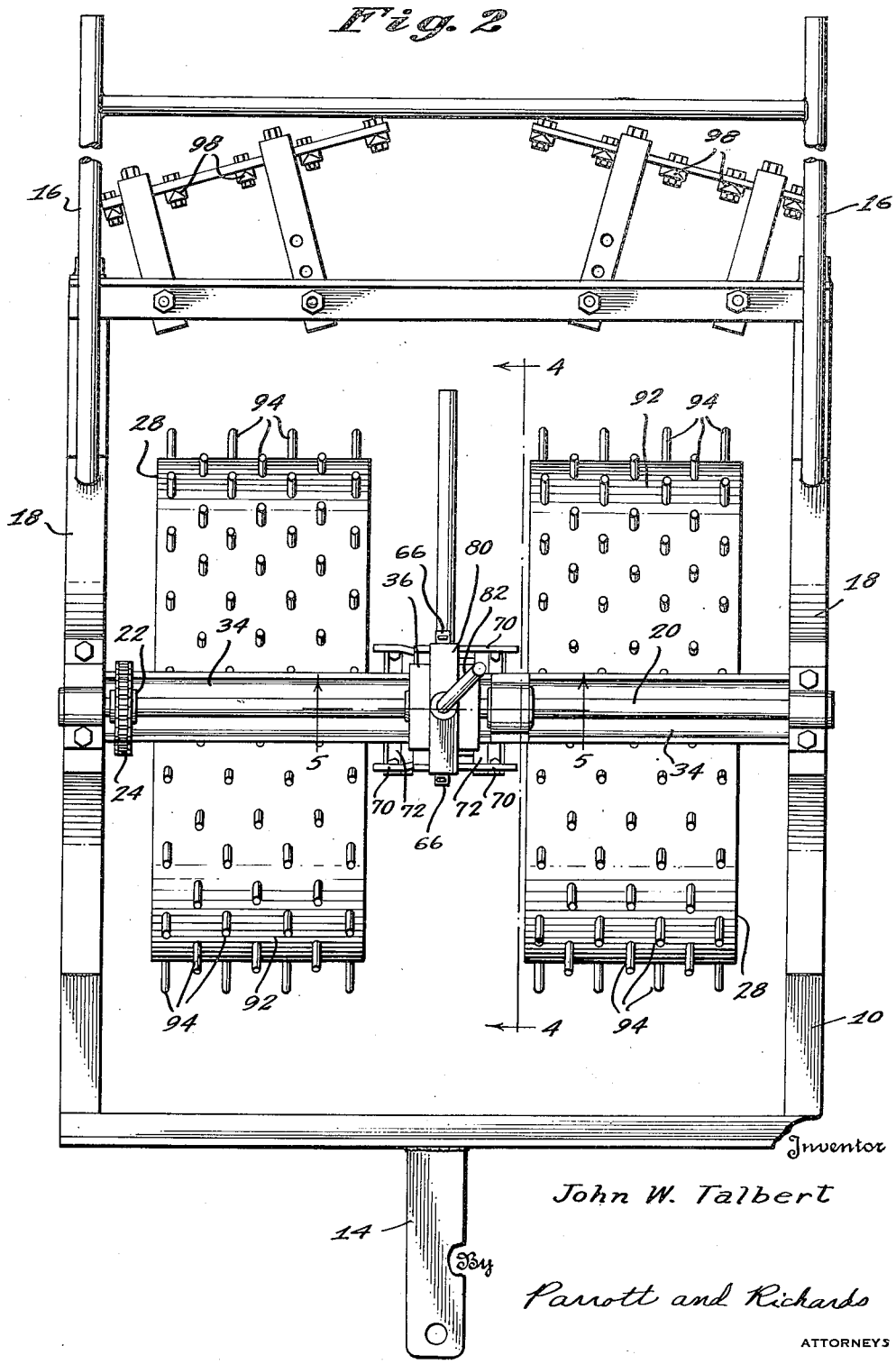

Feb. 26, 1952     J. W. TALBERT     2,587,406
COTTON CHOPPER
Filed Nov. 23, 1948     5 Sheets-Sheet 3
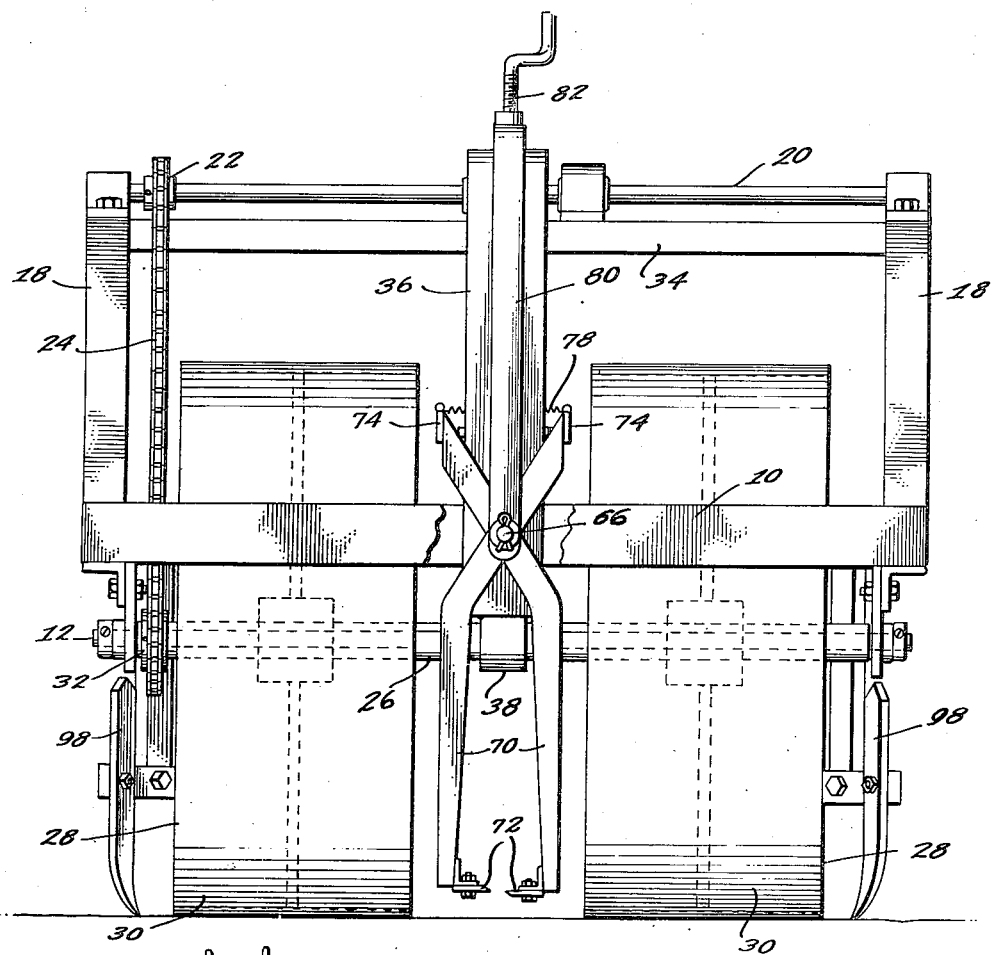
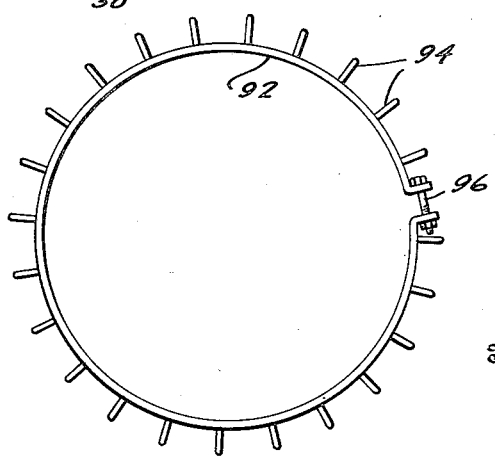
Inventor
John W. Talbert
By
Parrott and Richards
ATTORNEYS

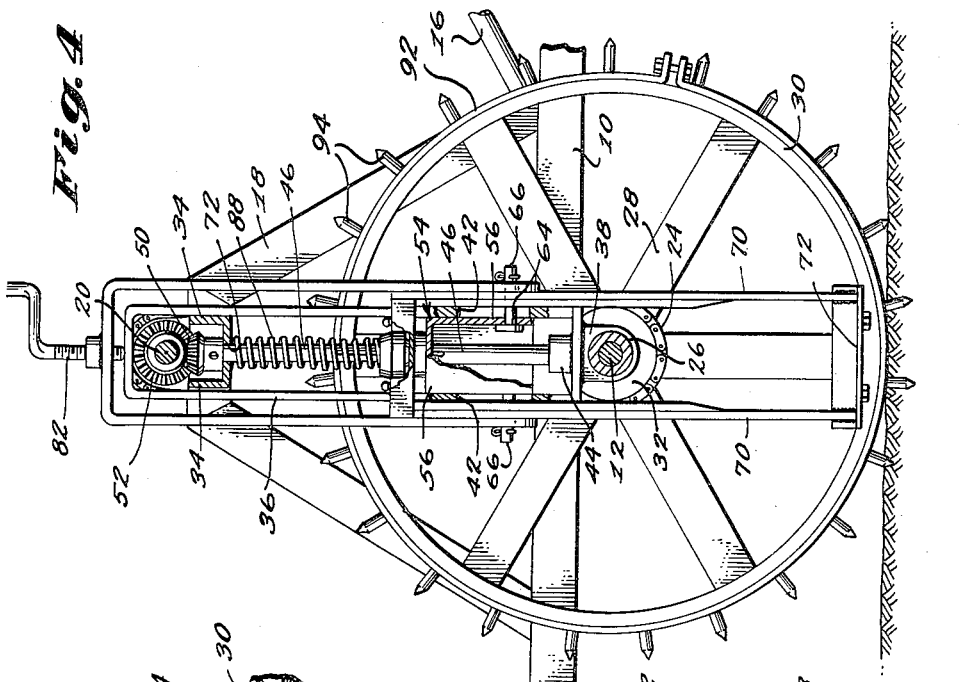

Feb. 26, 1952

J. W. TALBERT 2,587,406

COTTON CHOPPER

Filed Nov. 23, 1948

Inventor
John W. Talbert

By

Parrott and Richards
ATTORNEYS

Patented Feb. 26, 1952

2,587,406

UNITED STATES PATENT OFFICE 2,587,406

COTTON CHOPPER

John W. Talbert, Hartsville, S. C.

Application November 23, 1948, Serial No. 61,569

3 Claims. (Cl. 97—21)

This invention relates to agricultural implements and more especially to an agricultural implement particularly adapted for chopping cotton.

The operation of chopping or thinning out cotton is carried out after the cotton has obtained its first growth for the purpose of spacing the cotton plants properly and to cultivate them. This operation is commonly performed by hand with a hoe. A number of proposals have heretofore been made for providing machines to do this work, but insofar as I am aware none of these prior proposals have proved satisfactory in actual use because of the difficulty of obtaining uniform mechanical chopping action due to the unevenness of the ground over which the chopping machine must travel in the field.

According to the present invention a cotton chopper is provided incorporating ground wheels spaced for travel on each side of a row of cotton, and opposed chopping blades mounted on operating arms disposed vertically between the ground wheels in the plane of the axle for the ground wheels. By this arrangement the chopping blades are disposed for positioning by the ground wheels at a substantially uniform spacing from the ground at all times so that an even and uniform chopping action is obtained. The agricultural machine of the present invention may also be employed for thinning other crops, such as corn, although as previously noted it is particularly adapted for chopping cotton, and in the following more detailed description in connection with the accompanying drawings this application is used for purposes of illustration.

In the drawings:

Fig. 1 is a side view in elevation of a cotton chopper embodying the features of the present invention;

Fig. 2 is a top plan view of the cotton chopper shown in Fig. 1;

Fig. 3 is a front end view of the cotton chopper illustrated in Figs. 1 and 2, certain portions being broken away to illustrate more clearly certain details of construction;

Fig. 4 is a longitudinal sectional view taken substantially on the line 4—4 of Fig. 2;

Fig. 5 is an enlarged fragmentary sectional view taken substantially on the line 5—5 of Fig. 2;

Fig. 6 is an enlarged fragmentary sectional view taken substantially on the line 6—6 of Fig. 5;

Fig. 7 is a side view of one of the detachable cultivating tires;

Figure 8:
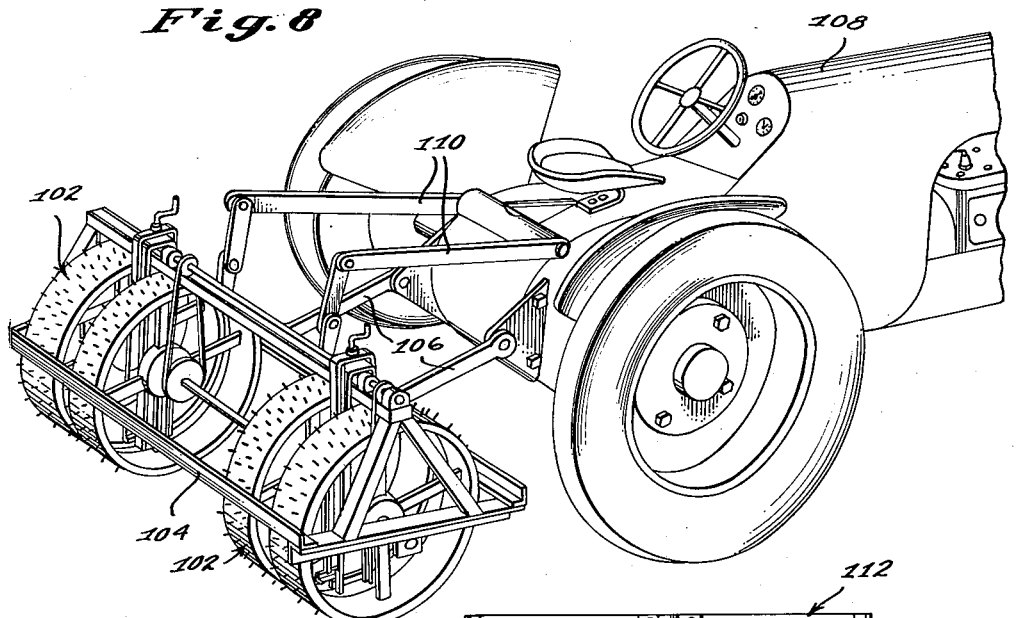
Fig. 8 is a perspective view illustrating a multiple row cotton chopper arranged according to the present invention for coupling to a conventional farm tractor.

Referring now to the drawings in detail, and more particularly at first to Figs. 1 and 2, the cotton chopper of the present invention as shown comprises a substantially rectangular horizontal frame 10 in which a transverse axle shaft 12 is mounted. In one embodiment of the invention a draft tongue 14 extends forwardly from the frame 10, and fixed adjacent the opposite end of the frame 10 are upwardly inclined rearwardly extending handle bars 16 which terminate at their rear ends in conventional hand grips of the type commonly employed in agricultural implements. The draft tongue 14 and handle bars 16 may be dispensed with if the cotton chopper is to be coupled to a tractor as pointed out further below.

Mounted on opposite sides of the frame 10 are upwardly extending brackets 18. These brackets 18 are formed adjacent their upper ends to provide aligned journal bearings for supporting a transverse drive shaft 20 disposed with its axis in the same vertical plane as the axis of the transverse axle shaft 12. The transverse drive shaft 20 carries adjacent one end a sprocket 22 over which is trained a drive chain 24 (compare Figs. 2 and 3).

Mounted for rotation on the transverse axle shaft 12 is a sleeve 26 on which are fixed ground wheels 28 spaced for travel on each side of a row of cotton and formed with broad flat annular treads 30. The sleeve 26 also carries a sprocket wheel 32 over which the drive chain 24 is trained from the sprocket 22 on the transverse drive shaft 20 so that rotation of the drive shaft 20 results whenever the ground wheels 28 are rotated.

Extending transversely between the upper ends of the brackets 18, in parallel relation with and directly below the shaft 20, is a support member 34 carrying midway between its opposite ends and in straddling relation thereto a vertically disposed yoke 36, the legs of which project downwardly and are welded or otherwise secured to a bearing member 38 carried on the sleeve 26 between the ground wheels 28. Suitable spacing collars 40 (see Fig. 5) are arranged on the sleeve 26 for positioning the bearing member 38 so as to maintain the vertical disposition of the yoke 36. The yoke 36 is further formed adjacent the lower end of each leg thereof with an elongated longitudinal slot 42, the purpose of which will appear presently.

The bearing member 38 is also fitted with a thrust seat 44 adapted to support and position the lower end of a vertical shaft 46 disposed centrally between the legs of the yoke 36. The vertical shaft 46 extends at its upper end through a positioning aperture 48 in the transverse support member 34, and carries a bevel gear 50 at its upper end which engages a bevel 52 carried on the transverse drive shaft 20 so that rotation of the drive shaft 20 is transmitted to the vertical shaft 46.

Adjacent the lower end of the vertical shaft 46, a support block designated generally by the reference numeral 54 is arranged for sliding movement on the shaft 46 and between the legs of the yoke 36. This support block 54 as shown in the drawings comprises an inverted, cup-shaped body 56, of rectangular form, the upper closed end of which is formed with an opening 58 and fitted with an aligned boss or washer 60 to accommodate the sliding movement of the body 56 on the vertical shaft 46, and to support a cam member 62 above the body 56 for rotation with the vertical shaft 46 as is described more in detail further below.

The body 56 is also formed with openings 64 adjacent its lower end which are aligned with the previously mentioned elongated slots 42 in the legs of the yoke 36, and which are adapted to receive studs 66 for projection through the slots 42, the elongated form of which permits the above noted sliding movement of the body 56. The lower end of the body 56 is further fitted with cross bars 68 which ride the side edges of the legs of the yoke 36 and thus act as guides which prevent binding of the studs 66 in the elongated slots 42 (compare Figs. 5 and 6).

The studs 66 serve as pivot points for pairs of crossed supporting arms 70 which carry the opposed chopping blades 72 at their lower ends. Each pair of supporting arms 70 also carry at their upper ends a bracket member 74 which supports cam followers 76 in relation to the previously mentioned cam member 62 disposed on the vertical shaft 46. Tension springs 78 are extended between the bracket members 74 so that the cam followers 76 are always maintained in contact with the cam member 62.

There is also fitted over the outwardly extending ends of the studs 66 a second yoke 80 which is disposed vertically in spaced relation to the first yoke 36, and which is fitted with an adjusting screw 82 at its top portion arranged to bear on the top portion of the yoke 36 and thus provide for vertical adjustment of the yoke 80 with respect to the yoke 36. It will be recognized that this adjusting arrangement also controls the vertical disposition of the supporting arms 70 and consequently allows the opposed chopping blades 72 to be adjusted in relation to the treads 30 of the ground wheels 28 for a desired spacing from the ground.

This adjusting arrangement is also accommodated by the previously described arrangement of the support block 56 for sliding movement on the vertical shaft 46 and between the legs of the first yoke 36. The cam member 62 which is supported above the support block 56 for rotation with the vertical shaft 46 is arranged to follow the sliding movement of the support block 56 by being fitted with a key 84 to engage an elongated keyway 86 found in the vertical shaft 46. A spring 88 is disposed over the vertical shaft 46 below the support member 34 as shown to maintain the cam member 62 seated on the support block 44 in all adjusted positions.

The form of cam member 62 is shown best in Fig. 6, in which it will be seen that the cam member 62 has a generally circular periphery interrupted by a pair of diametrically opposed notches 90. As previously noted, tension springs 78 are arranged to maintain the cam followers 76 in contact with the periphery of the cam member 62, and these tension springs 78 likewise urge the supporting arms 70 for movement to close the chopping blades 72. The generally circular periphery of the cam member 62 accordingly serves to hold the opposed chopping blades 72 open, and it is only as the cam member 62 is rotated so that the notches 90 are presented to receive the cam followers 76 that the opposed chopping blades 72 are allowed to close for chopping or shearing action as is described more fully below.

In order to cultivate the ground between the crop rows as the chopping operation is carried out, a suitable split band or tire 92 having spaced outwardly extending spikes 94 arranged on its periphery may be clamped as at 96 about each ground wheel 28 over the treads 30 thereof. Additional cultivating implements may also be arranged on the frame 10 as indicated at 98, if desired, to further work the soil on opposite sides of the crop rows.

For operation to chop cotton, the cotton chopper of the present invention, as described above and illustrated in Figs. 1 to 7, inclusive of the drawings, is hitched to a team of draft animals and is drawn along the standing rows of the plants to be thinned. As the ground wheels 28 rotate during travel through the field, their motion is transmitted through the sprocket chain 24 to drive the transverse drive shaft 20, which in turn drives the vertical shaft 46 through the bevel gears 50 and 52. The cam member 62 being arranged for rotation with the vertical shaft 46, as previously noted, will accordingly be rotated continuously during travel of the cotton chopper through the field to present the notches 90 periodically to receive the cam followers 76 and thus allow intermittent movement of the supporting arms 70 by the tension springs 78 to close the opposed chopping blades 72 for shearing action so that the standing plants are chopped at intervals to thin out the row. The driving ratio from the ground wheels 28 may be arranged as required to provide a proper spacing of the intervals at which the chopping action occurs. The height at which the plants are chopped in this manner may be regulated by manipulation of the adjusting screw 58 so that the yoke 56 is caused to move upwardly or downwardly, thus raising or lowering the opposed shear blades 60 as desired. The vertical disposition of the supporting arms 70 carrying the opposed chopping blades 72 between the ground wheels 28, and in the plane of the axle 12 for the ground wheels, results in disposing the opposed chopping blades 72 for positioning by the ground wheels 28 so that as the ground wheels follow the unevenness of the ground during travel in the field they maintain the opposed chopping blades 72 at a substantially uniform spacing above the ground and thus provide an even and uniform chopping action. In order to prevent operation of the opposed chopping blades 72 during travel to and from the field, a lever as indicated at 100 in Fig. 2, may be pivoted on the yoke 80 to move retaining arms (not shown) between the bracket members 74 carried at the upper ends of the supporting arms 70 and thus hold the opposed chopping blades open against the force of the tension springs 78.

Figure 9:
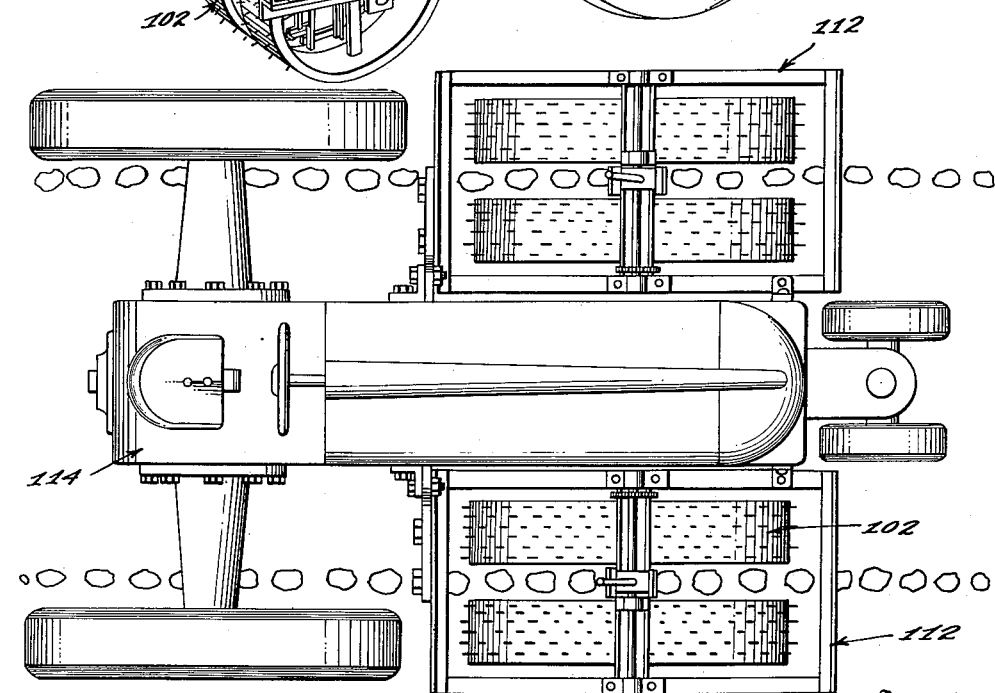
Fig. 9 is a top plan view of a modified arrangement for coupling cotton choppers embodying the present invention in multiples to a conventional farm tractor.

Figs. 8 and 9 of the drawing illustrate arrangements for coupling cotton choppers embodying the present invention in multiples to a conventional farm tractor. In Fig. 8, the arrangement shown comprises cotton chopper units 102 constructed in accordance with the present invention and spaced in multiples in a single frame 104 provided with coupling arms 106 adapted for pivoted connection at the rear end of the tractor 108. Conventional hydraulic lift arms 110 may be arranged as shown to raise the chopping units 102 clear of the ground when traveling to and from the field. The arrangement shown in Fig. 9 is substantially similar except that the chopping units 102 are mounted in separate frames 112 at each side of the tractor 114. An arrangement of this sort may be necessary in some instances where the tractor is not adapted for a rear hitch as shown in Fig. 8.

Alternatively, power means such as a small gasoline engine might be arranged directly on the frame structure of a cotton chopper constructed in accordance with the present invention to provide a self-propelled unit if desired.

I claim:

1. An agricultural machine particularly adapted for chopping cotton comprising a frame structure including an axle, a pair of ground wheels mounted on said axle in spaced relation for travel closely adjacent each side of a crop row, opposed chopping blades mounted on operating arms disposed vertically on said frame structure between said ground wheels, said operating arms being disposed on said frame structure by means including a vertically slidable yoke for adjusting said operating arms vertically on said frame structure and thereby establish the disposition of the chopping blades with respect to the ground wheels at a desired height, and tension springs extended between said operating arms for biasing them towards closed position and opposed cam means geared to said ground wheels for actuating said operating arms in relation to the rotation of said ground wheels so that closing of said opposed chopping blades by said tension springs occurs intermittently during travel of said ground wheels for chopping the standing plants in a crop row at spaced intervals to thin out the row.

2. An agricultural machine particularly adapted for chopping cotton comprising a frame structure including an axle, a pair of ground wheels mounted on said axle in spaced relation for travel closely adjacent each side of a crop row, a driven shaft horizontally disposed on said frame structure and spaced vertically above said axle, driving means connecting said drive shaft with said ground wheels whereby said drive shaft is rotated upon rotation of said ground wheels, a vertical drive shaft supported on said axle between said ground wheels and extending upwardly to a driving connection with said horizontal drive shaft, opposed chopping blades mounted on operating arms disposed vertically on said frame structure in straddling relation with respect to said vertical drive shaft, cam means carried on said vertical drive shaft for spacing said operating arms in open position and intermittently releasing them for movement to closed position, and tension springs extended between said operating arms for maintaining them in following contact with said cam means, whereby said opposed chopping blades are closed intermittently to chop the standing plants in a crop row at spaced intervals to thin out the row as the machine travels through a field.

3. An agricultural machine as defined in claim 2 and further characterized in that the operating arms carrying said opposed chopping blades are disposed on said frame structure by a vertical slidable yoke, and said cam means is slidingly keyed on said vertical drive shaft, and adjustable positioning means is provided for regulating the vertical position of said operating arms and cam means on said frame structure for establishing the disposition of the chopping blades with respect to the ground wheels at a desired height.

JOHN W. TALBERT.

REFERENCES CITED

The following references are of record in the file of this patent:

UNITED STATES PATENTS

| Number | Name | Date |
|---|---|---|
| 378,286 | Carley | Feb. 21, 1888 |
| 504,756 | Schofield | Sept. 12, 1893 |
| 716,725 | Lee | Dec. 23, 1902 |
| 797,875 | Sugg | Aug. 22, 1905 |
| 871,035 | Head | Nov. 12, 1907 |
| 997,623 | Kreulhaus | July 11, 1911 |

FOREIGN PATENTS

| Number | Country | Date |
|---|---|---|
| 393,011 | Germany | May 28, 1924 |